(12) United States Patent
Bernhardt et al.

(10) Patent No.: US 10,793,731 B2
(45) Date of Patent: Oct. 6, 2020

(54) BEAD POLYMER MADE OF HARD PHASE WITH DOMAINS OF A SOFT PHASE

(71) Applicant: Evonik Röhm GmbH, Darmstadt (DE)

(72) Inventors: Stefan Bernhardt, Offenbach (DE); Thomas Hasskerl, Kronberg (DE); Dirk Poppe, Frankfurt am Main (DE); Stephan Wieber, Karlsruhe (DE)

(73) Assignee: Evonik Operations GmbH, Essen (DE)

( * ) Notice: Subject to any disclaimer, the term of this patent is extended or adjusted under 35 U.S.C. 154(b) by 64 days.

(21) Appl. No.: 16/094,879

(22) PCT Filed: Apr. 12, 2017

(86) PCT No.: PCT/EP2017/058796
§ 371 (c)(1),
(2) Date: Oct. 18, 2018

(87) PCT Pub. No.: WO2017/182364
PCT Pub. Date: Oct. 26, 2017

(65) Prior Publication Data
US 2019/0127598 A1    May 2, 2019

(30) Foreign Application Priority Data
Apr. 20, 2016 (EP) .................................. 16166134

(51) Int. Cl.
| B33Y 70/00 | (2020.01) |
| B29C 64/165 | (2017.01) |
| B33Y 10/00 | (2015.01) |
| C09D 11/107 | (2014.01) |
| C08L 33/12 | (2006.01) |
| C09D 11/30 | (2014.01) |

(52) U.S. Cl.
CPC .......... *C09D 11/107* (2013.01); *B29C 64/165* (2017.08); *B33Y 10/00* (2014.12); *B33Y 70/00* (2014.12); *C08L 33/12* (2013.01); *C09D 11/30* (2013.01)

(58) Field of Classification Search
None
See application file for complete search history.

(56) References Cited

U.S. PATENT DOCUMENTS

| 5,523,106 A * | 6/1996 | Gimmler ................ A23P 30/32 |
| | | 426/302 |
| 2008/0281019 A1* | 11/2008 | Giller ..................... B33Y 70/00 |
| | | 524/8 |
| 2015/0030493 A1* | 1/2015 | Scott ........................ A61L 27/56 |
| | | 419/2 |
| 2015/0054195 A1 | 2/2015 | Greyf |
| 2015/0158249 A1 | 6/2015 | Goto |
| 2015/0344682 A1 | 12/2015 | Ganapathiappan et al. |
| 2016/0040003 A1 | 2/2016 | Nelliappan et al. |
| 2016/0083589 A1 | 3/2016 | Ganapathiappan et al. |
| 2016/0200045 A1 | 7/2016 | Hopkins |
| 2016/0312037 A1* | 10/2016 | Zhao ........................ C08L 77/02 |
| 2017/0113411 A1* | 4/2017 | Watanabe .............. A61K 6/891 |
| 2017/0252974 A1* | 9/2017 | Ng .......................... B29C 64/165 |
| 2019/0111479 A1* | 4/2019 | Kasperchik ............ B22F 3/008 |
| 2019/0126542 A1 | 5/2019 | Poppe et al. |

FOREIGN PATENT DOCUMENTS

| CN | 105 440 199 | 3/2016 |
| DE | 10 2007 025656 | 2/2008 |
| DE | 10 2007 061 445 | 6/2009 |

OTHER PUBLICATIONS

Evonik, High Perfoformance Plastics for optical applications, product brochure, pp. 1-26, no date.*
English translation of the International Search Report for PCT/EP2017/072673 filed Sep. 11, 2017, which is the international application corresponding to copending U.S. Appl. No. 16/337,238.
English translation of the Wriiten Opinion of the International Searching Authority for PCT/EP2017/072673 filed Sep. 11, 2017, which is the international application corresponding to copending U.S. Appl. No. 16/337,238.
English translation of the International Preliminary Report on Patentability for PCT/EP2017/072673 filed Sep. 11, 2017, which is the international application corresponding to copending U.S. Appl. No. 16/337,238.

(Continued)

*Primary Examiner* — Mary Lynn F Theisen
(74) *Attorney, Agent, or Firm* — Law Office of: Michael A. Sanzo, LLC

(57) ABSTRACT

The present invention relates to the technical field of 3D printing, in particular in the form of the binder jetting process in which particles in a powder bed are adhesive-bonded by means of a printed adhesive to give a three-dimensional object. The particles here can be inorganic materials, e.g. sand or a metal powder, or polymeric particles, such as polymethacrylates or polyamides. To this end, polymethacrylates can by way of example take the form of suspension polymers known as bead polymers.

In this context the present invention in particular relates to, as powders for 3D printing, suspension polymers which differ from the prior art in that they comprise a hard phase and an uncrosslinked soft phase.

20 Claims, No Drawings

(56) References Cited

OTHER PUBLICATIONS

European Search Report for EP 16190993.2 filed Sep. 28, 2016, which is the European application corresponding to copending U.S. Appl. No. 16/337,238.
Dubinsky, et al., "Hybrid porous material produced by polymerization-induced phase separation," *Chem. Commun.* 46:2578-2580 (2010).
Dubinsky, et al., "Toward Controlling the Surface Morphology of Macroporous Copolymer Particles," *Macromolecules* 42:1990-1994 (2009).
Gomez, et al., "Effects of Experimental Variables on the Synthesis of Porous Matrices," *Journal of Applied Polymer Science* 79:920-927 (2001).
Horák, et al., "Porous PolyHEMA Beads Prepared by Suspension Polymerization in Aqueous Medium," *Journal of Applied Polymer Science* 49:2041-2050 (1993).
Okay, et al., "Synthesis and Formation Mechanism of Porous 2-Hydroxyethyl Methacrylate-Ethylene Glycol Dimethacrylate Copolymer Beads," *Journal of Applied Polymer Science* 46:401-410 (1992).
Svec, et al., "New Designs of Macroporous Polymers and Supports: From Separation to Biocatalysis," *Science* 273(5272):205-211 (Jul. 1996).
U.S. Appl. No. 16/337,238, filed Mar. 27, 2019, Wieber.
English language translation of the International Search Report for corresponding PCT/EP2017/058796 filed Apr. 12, 2017.
English language translation of the Written Opinion of the International Searching Authority for corresponding PCT/EP2017/058796 filed Apr. 12, 2017.
English language translation of the International Preliminary Report on Patentability for corresponding PCT/EP2017/058796 filed Apr. 12, 2017.
European Search Report for corresponding European application, EP 16 16 6134 filed Oct. 24, 2016.
English language translation of the European Search Opinion for corresponding European application, EP 16 16 6134 filed Oct. 24, 2016.
English language translation of the International Search Report for PCT/EP2017/057909, filed Apr. 4, 2017, which is the international application corresponding to copending U.S. Appl. No. 16/092,996.
English language translation of the Written Opinion of the International Searching Authority for PCT/EP2017/057909, filed Apr. 4, 2017, which is the international application corresponding to copending U.S. Appl. No. 16/092,996.
English language translation of the International Preliminary Report on Patentability for PCT/EP2017/057909, filed Apr. 4, 2017, which is the international application corresponding to copending U.S. Appl. No. 16/092,996.
European Search Report for EP 16 16 4854 filed Sep. 20, 2016, which is the European application corresponding to copending U.S. Appl. No. 16/092,996.
English language translation of the European Search Opinion for EP 16 16 4854 filed Sep. 20, 2016, which is the European application corresponding to copending U.S. Appl. No. 16/092,996.
Presser, Jonas, "Neue Komponenten für das generative Fertigungsverfahren des 3D-Drucks," Dissertation (2012); retrieved from the internet: http://tuprints.ulb.tu-darmstadt.de/2963/, with English language machine translation of abstract.
U.S. Appl. No. 16/092,996, filed Oct. 11, 2018, Poppe.
Notice of Allowance dated Feb. 24, 2020 for copending U.S. Appl. No. 16/337,238.
Notice of Allowance dated Feb. 25, 2020 for copending U.S. Appl. No. 16/092,996.
Mostafaei, et al., "Powder bed binder jet printed alloy 625: Densification, microstructure and mechanical properties," *Materials and Design* 108:126-135 (2016).

\* cited by examiner

BEAD POLYMER MADE OF HARD PHASE WITH DOMAINS OF A SOFT PHASE

CROSS REFERENCE TO RELATED APPLICATIONS

The present application is US national stage of international application PCT/EP2017/058796, which had an international filing date of Apr. 12, 2017, and which was published on Oct. 26, 2017. Priority is claimed to European application EP 16166134.3, filed on Apr. 20, 2016.

FIELD OF THE INVENTION

The present invention relates to the technical field of 3D printing, in particular in the form of the binder jetting process in which particles in a powder bed are adhesive-bonded by means of a printed adhesive to give a three-dimensional object. The particles here can be inorganic materials, e.g. sand or a metal powder, or polymeric particles, such as polymethacrylates or polyamides. To this end, polymethacrylates can by way of example take the form of suspension polymers known as bead polymers.

In this context the present invention in particular relates to, as powders for 3D printing, suspension polymers which differ from the prior art in that they comprise a crosslinked hard phase and an uncrosslinked soft phase.

PRIOR ART

Binder jetting is an additive production process for which another term used, providing a good description of the process, is 3D inkjet powder printing. This process applies a liquid binder, for example by means of a commercially available inkjet printing head, onto a powder layer and thus brings about controlled bonding between a portion of the said powder layer. The said application alternates with application of new powder layers, the final result being formation of a shaped three-dimensional product. In this process in particular an inkjet printing head moves selectively across a powder bed and prints the liquid binder material precisely at the locations that are to be hardened. An example of the hardening procedure is the reaction between liquid vinylic monomers in the ink and peroxides present in the powder. The reaction is accelerated by a catalyst, for example based on an amine, to such an extent that it takes place at room temperature. The process is repeated layer-by-layer until a finished moulding has been produced. Once the printing process as ended, the moulding can be removed from the powder bed and optionally introduced into a post-treatment procedure.

Various materials can be used as binder and as powder material in binder jetting. Examples of suitable powder materials are polymer particles, sand, ceramic particles and metal powders with a respective diameter of from 10 to a few 100 μm. When sand is used there is mostly no need for downstream operations on the final article. In the case of other materials, for example polymer powders, inter alia PMMA, there can be a requirement for subsequent curing, sintering and/or infiltration of the article. However, these downstream operations are actually undesirable because they are time-consuming and/or expensive, because shrinkage often occurs and can adversely affect dimensional stability.

Polymer powders based on suspension polymers have in particular been used hitherto. The size of the polymer particles is generally from some tens of microns to some hundreds of microns. These particles feature good powder-flowability, do not cake, and give good results from application in the form of powder bed. If polymer particles comprising peroxides are used, it is easy to achieve reaction with the (meth)acrylate-containing binder. The disadvantage of a powder bed composed of abovementioned particles is the porosity of the resultant mouldings, because the liquid binder cannot fill all of the cavities.

The binder is generally applied by a method analogous to conventional two-dimensional printing of paper. Examples of binder systems are liquid vinylic monomers which are hardened by using peroxides present in the powder material. The powder material alternatively or additionally comprises a catalyst which accelerates hardening or which permits hardening only when ambient temperature is reached. Examples of this type of catalyst for acrylate resins or for acrylate monomers with peroxides as initiator are amines, in particular secondary amines.

Binder jetting has great advantages over other 3D printing processes such as FDM or SLS which are based on melting or welding of the material that forms the product: this process has the best suitability of all known processes for direct realization of coloured products with no subsequent colouring procedure. This process is also in particular suitable for production of particularly large articles: the products extending up to the size of a room are described. Other processes are moreover very time-consuming in relation to the entire printing procedure leading to the final product. Other than in relation to any possible downstream operations required, binder jetting can indeed be considered to be particularly time-efficient in comparison with the other processes. Binder jetting moreover has the great advantage, in comparison with other processes, that it does not introduce heat. When processes use melting or welding, this non-uniform introduction of heat produces stresses in the product that mostly then have to be dissipated in subsequent steps which take up additional time and incur additional cost, an example being thermal post-treatment.

Binder jetting has the disadvantage that the process causes porosity of the product: tensile strength values achieved for products printed by means of binder jetting are about 20 times smaller than for injection mouldings made of a comparable material. Because of this disadvantage, the binder jetting process has hitherto been used mainly for the production of decorative items or for the replication of sand moulds. The main cause of the porosity is that in known printing processes the binder does not fill all of the cavities between the particles. This is an inevitable result of the low viscosity of the liquid binder applied in the printing procedure. If a larger quantity is applied, this is lost by flowing into adjacent particles or cavities between the particles (interstices) directly prior to, and also during, the start of hardening. This in turn leads to an imprecise, blurred printed image and to low precision on the surface of the finished article.

The dissertation by J. Presser "Neue Komponenten für das generative Fertigungsverfahren des 3D-Drucks [New components for 3D printing as generative manufacturing process"] (TU Darmstadt, 2012) describes the use of precipitated emulsion polymers as powders for the binder jetting process. These emulsion polymers are to some extent successful in filling the interstices between the actual particles, and thus reduce porosity. However, the work-up procedure via coagulation, drying and sieving leads to secondary particles that are not round, with irregular size distribution. It has moreover been found that the emulsion polymers used in this way provide almost no increase of bulk density and have no significant influence on the stability of the printed product.

OBJECT

The object underlying the present invention was to accelerate the binder jetting process by permitting application of print to plastics particles without any requirement for time-consuming downstream operations on the product.

Another object was improvement of the mechanical stability of products of a binder jetting process, in particular those based on a polymer powder, in particular on a PMMA powder, in a way that allows use of the said products as functional parts.

A particular object in this context was to realize mouldings which have at least 50% of the tensile modulus of elasticity of an analogous injection-moulded part. "Analogous" means here by way of example that a PMMA injection moulding is compared with a binder jetting product based on a PMMA powder.

Other objects not explicitly mentioned can become apparent from the description, the examples or the claims of the present application, or from the entire context of the same.

ACHIEVEMENT OF OBJECT

Surprisingly, these objects were achieved by means of a novel process for the production of three-dimensional objects from a powder bed by means of a binder jetting process. The three-dimensional object is formed in this process via multiple repetition of the following steps: a) application of a new powder layer on the surface of the powder bed and b) selective application of a binder and subsequent or simultaneous hardening of this binder in the powder bed. According to the invention, the powder bed here comprises at least one type of particle, characterized in that the diameter of these particles is from 10 to 500 μm and the said particles have at least two different phases. According to the invention, the glass transition temperature of the first phase is below 40° C. and the glass transition temperature of the second phase is above 70° C. The glass transition temperatures are measured according to the invention by DSC (differential scanning calorimetry).

It is preferable that the particle here is a polymer particle comprising at least one initiator suitable for the hardening of the binder or one catalyst or accelerator that accelerates the hardening. The initiators mentioned can by way of example be peroxides or azoinitiators well known to the person skilled in the art. The accelerators are by way of example compounds which, in combination with an initiator, which in turn per se has a relatively high decomposition temperature, lower the decomposition temperature of this initiator. This allows curing to begin at a temperature as low as ambient temperature in the printer, or during a heat-conditioning step extending to 50° C. Examples of a suitable initiator with high decomposition temperature here would be secondary or tertiary, mostly aromatic amines. Catalysts mentioned can have a corresponding or similar activating effect. However, it is generally a simple matter for the person skilled in the art to select the precise composition of the initiator system.

It is particularly preferable that the particles, or the polymer particles, are PMMA suspension polymers with a median diameter of from 25 to 150 μm, preferably from 30 to 110 μm and particularly preferably from 35 to 100 μm.

A particularly preferred feature of the first phase of the polymer particle is that this phase is a phase which has a glass transition temperature below 30° C. and at least 60% by weight of which is produced from acrylates.

It is particularly preferable that the second phase of the polymer particle is a phase which has a glass transition temperature above 80° C. and at least 60% by weight of which is produced from MMA.

The process of the invention provides the particularly great advantage of particularly rapid dissolution of the soft phase of the polymer particles, leading to a rapid increase in the viscosity of the binder, which in turn prevents the flooding of lower-lying powder layers on which printing is not intended, within the powder bed. Another advantage here is the possibility of industrial-scale use of the process of the invention.

The present invention provides not only the process mentioned for the production of three-dimensional objects but also a process for the production of the two-phase polymer particles used for that purpose. This process for the production of the polymer particle preferably features suspension polymerization with sequential addition of the two monomer mixtures that lead to the respective phases.

Suspension polymers used are by way of example pulverulent materials which are produced by free-radical polymerization in the presence of water and which have a volume-average median particle diameter (d50) of from 30 to 120 μm. It is particularly preferable that the suspension polymers are PMMA or are MMA copolymers. To this end, the comonomers can be selected by way of example from the group of the acrylates, methacrylates and styrene.

In particular, it is preferable here that the second phase is produced first by suspension polymerization. When this has proceeded to the extent that at least 75% by weight, particularly preferably at least 85% by weight, with particular preference at least 90% by weight, of the monomers used of this second phase have reacted, a monomer mixture for the production of the first phase is added to this suspension. This second monomer mixture for the production of the first phase is characterized in that the glass transition temperature of the polymer resulting therefrom is below 40° C., preferably below 30° C., and this polymer is not miscible with PMMA or with the polymer of the second phase.

It is significantly preferable that this monomer phase for the production of the second phase, the hard phase, comprises at least one crosslinking agent. It is preferable that this phase comprises from 0.1 to 10% by weight, particularly from 1 to 5% by weight of crosslinking agent. Particularly preferred crosslinking agents are di- or tri(meth)acrylates.

If a larger quantity of crosslinking agent is used it is possible that a small quantity of this crosslinking agent remains available for further polymerization when the second monomer mixture is added for the production of the first polymer phase. This can lead to two different effects. Firstly, it can contribute to at least some extent of covalent bonding between the two phases; this would indeed be desirable up to a certain level, and can contribute to the stability of the particle. Secondly, it is possible that very slight crosslinking, or an additional molecular weight increase, also occurs in the soft phase of the polymer particle.

In an embodiment of this process that has proved to be advantageous, but not essential, both monomer phases respectively comprise an initiator or an initiator mixture. In a particularly advantageous form of this embodiment, the initiator(s) in the second monomer mixture for the production of the first phase have a higher decomposition temperature. It is preferable each phase comprises precisely one initiator. However, it is in principle also possible to use mixtures of a plurality of initiators.

It is particularly preferable that the ratio of the first phase to the second phase is from 1:9 to 1:1.5. These data relate to the entirety of the monomer phases used in the process; of course, these are never simultaneously present in the entirety alongside one another.

The morphology of the resultant polymer particles results from the selection of the specific reaction conditions: if the second monomer mixture has little time for incipient swelling of the crosslinked PMMA from the first polymerization, and if the said mixture is used in excess in relation to the first monomer mixture, the second polymerization gives soft suspension polymers with hard, crosslinked PMMA cores. Firstly, it is therefore preferable to select a substoichiometric quantity of the second monomer mixture. Secondly, for the polymerization of the second monomer mixture it is preferable to select an initiator which decomposes at a higher temperature than that of the first polymerization stage. The second monomer mixture monomer mixture thus has sufficient time for incipient swelling of the crosslinked PMMA particles while the mixture is heated for the second polymerization stage. During this second polymerization stage the first polymer phase demixes, as it is being produced, from the second polymer phase within the polymer beads. As a result of the crosslinking in the first polymer stage, no macrophase separation occurs, but instead the soft phase of the first polymer phase is produced in the form of small domains. Good control and reproducibility of domain size can be achieved. There is moreover no requirement to cool the mixture during polymerization. Thirdly, the crosslinking of the external structure achieves high dimensional stability in the binder jetting process, even when the printing procedure applies large quantities of binder.

According to the invention, all glass transition temperatures are determined by means of DSC. In this connection, the person skilled in the art is aware that DSC provides valid results only if, after a first heating cycle extending to a temperature that is at least 25° C. above the highest glass transition temperature or melting point while being at least 20° C. below the lowest decomposition temperature of a material, the material sample is kept at his temperature for at least 2 min. The material is then cooled back to a temperature that is at least 20° C. below the lowest glass transition temperature or melting point to be determined, where the cooling rate should be at most 20° C./min, preferably at most 10° C./min. After a further waiting time of a few minutes, the actual measurement is then made by heating the sample up to at least 20° C. above the highest melting point or glass transition temperature at a heating rate that is generally 10° C./min or lower. Simple preliminary measurements using a separate sample can be used for prior approximation of the respective highest and lowest temperature limits.

When this process is used for the production of the polymer particles, demixing actually occurs during the sequential polymerization procedure. Microstructured two-phase suspension polymers are thus produced. These have one phase which dissolves easily and rapidly on contact with solvent or monomer and thus thickens the binder. It is thus possible to use more binder in the actual printing process without losing dimensional accuracy. However, another advantage that can be achieved simultaneously is lower porosity of the final product and thus higher mechanical stability of the same.

The detailed descriptions provided below serve for explanation of a method for producing a preferred embodiment. However, these descriptions are not intended to restrict the present invention in any way:

The aqueous phase comprises deionized water, dispersing agent and optionally other surface-active substances, and also processing aids.

Droplets of a mixture of MMA with a suitable crosslinking agent molecule, for example a dimethacrylate or allyl methacrylate, and with an initiator, in particular a peroxide or a diazo compounds, with suitable decomposition kinetics, are dispersed with stirring and a level of shear that depends on the desired particle size, to give fine droplets, and polymerization of the monomer phase is brought about via an external influence such as temperature increase. Crosslinked PMMA particles are produced.

With continued stirring, a mixture of monomer(s) with an initiator characterized by a higher decomposition temperature than that for the 1st polymerization is added. The monomer or the monomer mixture is characterized in that the glass transition temperature of the polymer or copolymer produced therefrom is below 30° C. and the said polymer or copolymer is not miscible with PMMA. Examples of suitable monomers are acrylates, e.g. methyl, ethyl, propyl, butyl or ethylhexyl acrylate.

Incompatibility of the dissolved polymer and the new polymer causes demixing of the polymer phases, and these phases form relatively spherical particles with an internal second phase.

It is preferable that some residual peroxide content remains in the soft second phase and leads, by virtue of the relatively high dissolution rate of the soft phases, to greater uniformity of completely polymerization of the monomer mixture applied by way of inkjet for the hardening procedure.

The polymer beads are used as power bed in the binder jetting process. On printing with a liquid, e.g. solvent and/or monomer mixture, which can optionally also comprise other components, the continuous phase and the disperse phase therein dissolve at different rates. With increased level of crosslinking of the disperse phase, the effect is merely incipient swelling rather than complete solution.

Controlled adjustment of dissolution properties can be achieved via selection of the monomers for continuous and disperse phase. Dissolution begins more rapidly for soft polymers with low glass transition temperature here than for hard polymers with higher glass transition temperature. Solubility is also dependent on the properties of the solvent or monomer used as solvent. Features of good solvents here are low viscosity and polarity similar to that of the resin to be dissolved.

The invention claimed is:

1. A binder jetting process for the production of three-dimensional objects from a powder bed, wherein the process comprises multiple repetition of the following steps:
   a) application of a new powder layer on the surface of the powder bed; and
   b) selective application of a binder and subsequent or simultaneous hardening of the binder in the powder bed, wherein the powder bed comprises particles, and wherein:
      i) the particles comprise a PMMA suspension polymer and have an average diameter of from 30 to 110 μm;
      ii) the particles have at least two different phases, wherein the glass transition temperature of the first phase, measured by differential scanning calorimetry (DSC), is below 40° C. and the glass transition temperature of the second phase, measured by DSC, is above 70° C.

2. The process of claim 1, wherein the particles comprise at least one initiator suitable for hardening of the binder or one catalyst or accelerator that accelerates hardening.

3. The process of claim 2, wherein the ratio of the first phase to the second phase is from 1:9 to 1:1.5.

4. The process of claim 1, wherein the ratio of the first phase to the second phase is from 1:9 to 1:1.5.

5. The process of claim 1, wherein the glass transition temperature of the first phase, measured by DSC, is below 30° C. and the glass transition temperature of the second phase, measured by DSC, is above 80° C.

6. A binder jetting process for the production of three-dimensional objects from a powder bed, wherein the process comprises multiple repetition of the following steps:
   a) application of a new powder layer on the surface of the powder bed; and
   b) selective application of a binder and subsequent or simultaneous hardening of the binder in the powder bed, wherein the powder bed comprises particles that:
      i) have a diameter of from 10 to 500 μm; and
      ii) have at least two different phases, wherein
         the glass transition temperature of the first phase, measured by DSC, is below 30° C.;
         the glass transition temperature of the second phase, measured by DSC, is above 70° C.;
         at least 60% by weight of the first phase is produced from acrylates.

7. The process of claim 6, wherein the ratio of the first phase to the second phase is from 1:9 to 1:1.5.

8. The process of claim 7, wherein the particles comprise at least one initiator suitable for hardening of the binder or one catalyst or accelerator that accelerates hardening.

9. The process of claim 6, wherein the particles comprise at least one initiator suitable for hardening of the binder or one catalyst or accelerator that accelerates hardening.

10. The process of claim 6, wherein at least 60% by weight of the second phase is produced from MMA and the glass transition temperature of the second phase, measured by DSC, is above 80° C.

11. A binder jetting process for the production of three-dimensional objects from a powder bed, wherein the process comprises multiple repetition of the following steps:
   a) application of a new powder layer on the surface of the powder bed; and
   b) selective application of a binder and subsequent or simultaneous hardening of the binder in the powder bed, wherein the powder bed comprises particles that:
      i) have a diameter of from 10 to 500 μm; and
      ii) have at least two different phases, wherein
         the glass transition temperature of the first phase, measured by DSC, is below 40° C.;
         the glass transition temperature of the second phase, measured by DSC, is above 80° C.; and
         at least 60% by weight of the second phase is produced from MMA.

12. The process of claim 11, wherein the ratio of the first phase to the second phase is from 1:9 to 1:1.5.

13. The process of claim 12, wherein the particles comprise at least one initiator suitable for hardening of the binder or one catalyst or accelerator that accelerates hardening.

14. The process of claim 11, wherein the particles comprise at least one initiator suitable for hardening of the binder or one catalyst or accelerator that accelerates hardening.

15. A binder jetting process for the production of three-dimensional objects from a powder bed, wherein the process comprises multiple repetition of the following steps:
   a) application of a new powder layer on the surface of the powder bed; and
   b) selective application of a binder and subsequent or simultaneous hardening of the binder in the powder bed, wherein the powder bed comprises particles that:
      i) have a diameter of from 10 to 500 μm;
      ii) have at least two different phases, wherein the glass transition temperature of the first phase, measured by DSC, is below 40° C. and the glass transition temperature of the second phase, measured by DSC, is above 70° C.;
      iii) have been produced by suspension polymerization with sequential addition of two monomer mixtures that lead to the respective phases.

16. The process of claim 15, wherein the ratio of the first phase to the second phase is from 1:9 to 1:1.5.

17. The process of claim 16, wherein the particles comprise at least one initiator suitable for hardening of the binder or one catalyst or accelerator that accelerates hardening.

18. The process of claim 15 wherein the particles comprise at least one initiator suitable for hardening of the binder or one catalyst or accelerator that accelerates hardening.

19. The process of claim 15, wherein at least 60% by weight of the first phase is produced from acrylates and the glass transition temperature of the first phase, measured by DSC, is below 30° C.

20. The process of claim 15, wherein at least 60% by weight of the second phase is produced from MMA and the glass transition temperature of the second phase, measured by DSC, is above 80° C.

* * * * *